₃,₅₇₃,₂₃₄
FLEXIBLE AND HYDROPHILIC POLYURETHANE FOAM AND METHOD OF MAKING SAME
Alexis Archipoff, Carouge, Geneva, Switzerland, Jerome Dupuy, Calais, France, and Joerg Sambeth, Carouge, Geneva, Switzerland, assignors to Elekal, Paris, France
No Drawing. Filed Apr. 24, 1968, Ser. No. 723,889
Claims priority, application Switzerland, May 2, 1967, 6,331/67
Int. Cl. A47l 13/16; C08g 22/46, 41/04
U.S. Cl. 260—2.5        14 Claims

ABSTRACT OF THE DISCLOSURE

The invention consists in adding to the usual compounds involved in making a flexible open-cell polyurethane foam by the so-called "one-shot" method, from 5 to 20%, preferably 10 to 15%, by weight, in relation to the amount of polyol that is used, of at least one alkaline salt of carboxymethyl hydroxyethyl cellulose in fine powder form, thereby to produce a polyurethane foam having improved hydrophilic properties.

A foam produced in this way may be modified by treating it is an additional step with an aqueous solution of a salt of a metal having a valence of at least 2, e.g., aluminum.

---

This invention relates to flexible and hydrophilic polyurethane foams.

Flexible polyurethane foams having an appearance somewhat similar to natural sponges have been known for some time, such polyurethane foams being used in the form of sponges for washing motor cars and for household and other purposes. These flexible polyurethane foams consist, as is known, of a polyurethane polymer prepared from a polyether polyol and an organic polyisocyanate or a polyester polyol and depending on the nature of the polyols used for their manufacture they may have either an open-cell or a closed-cell structure, the open-cell foams having a better capacity for water absorption than the closed-cell foams. However, these known polyurethane foams, even when they have an open-cell structure, have generally been found to have an insufficient capacity for water absorption, thereby limiting their usefulness.

An object of the invention is to provide a flexible and hydrophilic polyurethane foam having an improved capacity for water absorption.

The foam provided by the present invention essentially consists, of polyurethane polymer prepared with a polyether polyol or a polyester polyol based polyurethane polymer having an open-cell structure and is characterized in that it contains from 5 to 20%, preferably from 10 to 15%, by weight, in relation to the polyol, of at least one alkaline salt of carboxymethyl hydroxyethyl cellulose in the form of fine particles homogeneously distributed in the pores of the polyurethane.

The invention also provides a method of making such a foam. This method consists in an adaptation of the known so-called "one-shot" method of making polyurethane foam. The method provided by the invention comprises reacting in one shot at least one polyether or polyester based polyol at ambient temperature with at least one organic polyisocyanate in the presence of water, of at least one catalyst consisting of a fatty acid salt of divalent tin, of at least one catalyst consisting of a tertiary amine, and of at least one surface active agent, and is characterized by incorporating into the reaction medium from 5 to 20%, preferably from 10 to 15%, by weight, in relation to the polyol, of at least one alkaline salt of carboxymethyl hydroxyethyl cellulose.

The method according to the present invention thus consists in admixing with the starting substances used in making polyurethane foams by the "one-shot" method a sufficient quantity of an alkaline salt of carboxymethyl hydroxyethyl cellulose in order to improve substantially the capacity for water absorption of the foam thus produced, compared to the capacity for water absorption of foams made in the same way but without incorporating alkaline carboxymethyl hydroxyethyl cellulose salt.

By way of alkaline carboxymethyl hydroxyethyl cellulose salt use is preferably made of the sodium salt of a carboxymethyl hydroxyethyl cellulose having a degree of substitution of the order of 0.3 carboxymethyl groups and 0.7 hydroxyethyl groups per structural element. Thus, use is for instance made of a powdered sodium salt of carboxymethyl hydroxyethyl cellulose known by the trade name CMHEC–37 made by Hercules Powder Company.

If the amount of alkaline carboxymethyl hydroxyethyl cellulose salt that is used is less than 5% by weight of the polyol the hydrophilic properties of the resultant foam are insufficient.

On the other hand, if the amount of alkaline carboxymethyl hydroxyethyl cellulose salt that is incorporated in the reaction medium is greater than 20% by weight of the polyol, a mass is obtained having too great a viscosity to enable a foam to be produced.

Use is preferably made of the same polyester or polyether based polyols as those used in making flexible polyurethane foams by the known methods. However, it is preferred to use polyether based polyols when it is desired to produce a foam having optimum mechanical strength and resistance to hydrolysis.

By way of polyester based polyol, use is preferably made of the reaction products of at least one polyalcohol with at least one organic polyacid, for example an aliphatic polyacid. Said polyalcohol may, for instance, either be a diol, such as ethylene glycol, propylene glycol, trimethylene glycol, diethylene glycol, dipropylene glycol, 1,3-butanediol and 1,4-butanediol, or a polyalcohol containing more than two hydroxyl groups, such as glycerine, sorbitol, pentaerythrol and inositol.

By way of polyether based polyol, use is for instance made of diols, such as polypropylene glycol, or triols, or polyols having more than three hydroxyl functional groups and which are produced by adding propylene oxide molecules or both ethylene oxide molecules and propylene oxide molecules to compounds having active hydrogen atoms such as polyalcohols and polyamines.

The preferred organic polyisocyanates are those employed in the known methods of making flexible polyurethane foams and in particular the following polyisocyanates: 2,4- and 2,6-tolylene diisocyanates, 1,4- and 1,5-naphthylene diisocyanates, 4,4'-diphenylmethane diisocyanate, paraphenylene diisocyanate, hexamethylene diisocyanate, dimeric 2,4-tolylene diisocyanate, 1,4-cyclohexane diisocyanate, 4,4',4''-triphenylmethane triisocyanate and polymethylene polyphenylisocyanates comprising from 3 to 5 benzene rings. A mixture of these polyisocyanates can also be used.

The alkaline carboxymethyl hydroxyethyl cellulose salt is incorporated into the reaction medium by energetically stirring the starting substances used in making the foam while the salt is being added, preferably in powder form. It is preferred, in order to achieve improved homogeneity of the reaction medium and consequently of the resulting foam, to first mix the powdered alkaline carboxymethyl hydroxyethyl cellulose salt with the polyol to form a binary mixture and then to add the catalysts and the surface active agent to this binary mixture, this latter operaion being carried out either just before causing any of these substances to react with the water and the polyisocyanate or at the same time as this reaction is made to take place.

If it is desired to achieve a homogeneous mixture of the powdered alkaline carboxymethyl hydroxymethyl cellulose salt and of the other substances, the particles of this powder should preferably have a size less than 0.2 mm.

It is preferred to fully dry the powdered alkaline carboxymethyl hyqdroxyethyl cellulose salt before use so that the amount of this substance and the amount of water which are made to react can be determined accurately to the desired values.

It is to be noted that the hydroxyl groups at the free ends of the hydroxyethyl groups of the alkaline carboxymethyl hydroxyethyl cellulose salt may possibly each react with an isocyanate group when the foam is being formed so that these hydroxyl groups should be taken into account to the same extent as those of the polyol and as the water molecules when determining the amount of polyisocyanate which has to be reacted for a given "isocyanate index" to be obtained. To produce foams having good mechanical properties, in particular good tensile strength when wet, this isocyanate index must, as is known, be slightly greater than 100.

In the presence of alkaline carboxymethyl hydroxymethyl cellulose salt, the foam is formed under the usual conditions. In particular, the time needed for the foam to "rise" is the same as when this substance is not present.

It is to be noted that a particularly pleasant feel can be imparted to the foams thus produced by immersing them for a few minutes in an aqueous solution of a metal salt having a valency of at least 2, preferably a trivalent or tetravalent metal salt, such as an aluminum salt, in particular aluminum nitrate, a trivalent iron salt or a tetravalent tin salt, followed by wringing and rinsing in clear water.

The following examples further illustrate the invention.

EXAMPLE 1

By stirring with a rotary stirrer turning at 3500 r.p.m., an intimate mixture of the following substances was prepared:

| | Grams |
|---|---|
| Niax 14–46 (a primary polyether triol having an OH index of 46 made by Union Carbide) | 100 |
| Sodium salt of carboxymethyl hydroxyethyl cellulose (CMHEC–37 made by Hercules Powder Company | 10 |
| SF1066 silicone oil (General Electric)[1] | 2 |
| $A_1$ catalyst (a tertiary amine made by Union Carbide)[2] | 0.2 |
| Stannous octoate | 0.2 |

[1] Dimethylpolysiloxane polyoxyalkylene ether copolymer.
[2] [(CH$_3$)$_2$NCH$_2$CH$_2$]$_2$O.

The mixing of the above indicated substances was carried out in two phases. The first consisted in mixing the polyol and the sodium salt of carboxymethyl hydroxyethyl cellulose until a homogeneous mixture is obtained. This required a stirring time of about 30 seconds. The second phase of the mixing, which lasted about 15 seconds, took place after having added the silicone oil and the catalysts.

There was then added, in succession and without ceasing to stir the mixture, 3.5 g. of water and 47.6 g. of tolylene diisocyanate containing 80 mole percent of the 2,4 isomer and 20 mole percent of the 2,6 isomer, this amount of tolylene diisocyanate corresponding to a "TDI index" of 105.

After having introduced the diisocyanate into the reaction medium, stirring was continued for 5 to 7 seconds, i.e. until the mixture suddenly assumed a creamy appearance. The whole of the mixture was then poured very quickly into a cardboard mold internally lined with paper.

A rapid foaming action then took place which caused the foam to "rise" and to fill the entire mold in less than one minute. The foam was then put for one hour into an oven kept at a temperature of 120° C., whereupon it was returned to ambient temperature and removed from the mold.

The resulting block of foam was then cut up with ease into smaller pieces of desired shape and size for use as sponges.

A particularly soft and pleasant feel was imparted to these sponges by immersing them for 5 to 10 minutes in a 20% solution of aluminum nitrate.

EXAMPLE 2

The procedure was the same as in Example 1, but with 15 instead of 10 g. of CMHEC–37 and with 49.6 instead of 47.6 g. of tolylene diisocyanate.

EXAMPLE 3

The procedures was the same as in Example 1, but using instead of 100 g. of Niax 14–46, 100 g. of Desmophene 3600 which is a linear polypropylene glycol having a molecular weight of about 2000 and an OH index of 56, made by Bayer of Leverkusen.

Here, 10 g. of CMHEC–37 and 48.7 g. of tolylene diisocyanate were used.

EXAMPLE 4

The procedure was the same as in Example 3, but with 15 g. of CMHEC–37 and 50.7 g. of tolylene diisocyanate.

EXAMPLE 5

A reference foam was made in the same way as in Example 1 but without any CMHEC and with 43.5 g. of tolylene diisocyanate (TDI index=105).

EXAMPLE 6

A reference foam was made in the same way as in Example 3 but without any CMHEC and with 44.6 g. of tolylene diisocyanate (TDI index=105).

The capacity for water absorption of the foams made in accordance with the above examples were evaluated by measuring the "capillary absorption coefficient" as described in French Pat. No. 1,284,015.

The capacity for water absorption of the foams made in accordance with the method provided by the invention were also evaluated in the following conventional way which gives what is termed the "wiping efficiency."

This involved spreading as uniformly as possible 50 cc. of water on a flat and horizontal square surface measuring 50 x 50 cm.

With a sponge made from the foam whose "wiping efficiency" was to be measured and having the shape of a parallelipipedic block of known weight and of standard size, i.e. 14 x 9 x 5 cm., five wiping strokes were made in a direction parallel to one of the sides of the square with one larger face of the sponge in such a way that the latter passed over the entire area of said square and then five further wiping strokes were made in a direction at right angles to the first direction with the other large face.

The weight of the water picked by the sponge was then worked out differentially. This weight multiplied by a factor of 2 is the value of the wiping efficiency. It will be apparent that this value is the percentage in weight of the water absorbed by the sponge in relation to the initial amount of water spread on to the surface to be wiped.

The characteristic properties of the various foams made in accordance with the foregoing examples are given in the following table.

| | Capillary absorption coefficient | Wiping efficiency, percent | Tensile strength when moist, g./cm.$^2$ |
|---|---|---|---|
| Example 1 | 113 | 90.5 | 430 |
| Example 2 | 75 | 83 | 521 |
| Example 5 [1] | 40 | 74 | 625 |
| Example 3 | 93 | 84 | 450 |
| Example 4 | 77 | 71 | 500 |
| Example 6 [1] | 35 | 65.4 | 580 |

[1] Reference foam.

It will be observed, upon comparing the wiping efficiency values and upon comparing the capillary absorption coefficient values of the various foams made according to the above examples, that by adding, in accordance with the method provided by the invention, alkaline carboxymethyl hydroxyethyl cellulose salt to the reaction medium when making flexible polyurethane foams, a substantial improvement of the capacity for water absorption of these foams can be achieved.

What is claimed is:

1. A flexible and hydrophilic polyurethane foam which consists essentially of polyurethane polymer prepared from a polyether polyol or a polyester polyol and an organic polyisocyanate and having an open-cell structure, said polyurethane foam containing from 5 to 20% by weight, based on the polyol, of at least one alkaline salt of carboxymethyl hydroxyethyl cellulose in the form of fine particles homogeneously distributed in the pores of the polyurethane.

2. A polyurethane foam as claimed in claim 1, wherein the alkaline salt of carboxymethyl hydroxyethyl cellulose is present in an amount of 10 to 15% by weight based on the polyol.

3. A polyurethane foam as calimed in claim 1 wherein said particles have a diameter less than 0.2 mm.

4. A polyurethane foam as claimed in claim 1, wherein said alkaline salt of carboxymethyl hydroxyethyl cellulose is the sodium salt.

5. A polyurethane foam as claimed in claim 1, wherein said alkaline salt of carboxymethyl hydroxyethyl cellulose has a degree of substitution of about 0.3 carboxymethyl groups and of 0.7 hydroxyethyl groups.

6. A method of making a flexible and hydrophilic polyurethane foam which comprises reacting in one shot at least one polyether or polyester based polyol at ambient temperature with at least one organic polyisocyanate in the presence of water, at least one catalyst consisting of a fatty acid salt of divalent tin, at least one catalyst consisting of a tertiary amine, and at least one surface active agent, said method further comprising incorporating into the reaction medium from 5 to 20% by weight, based on the polyol, of at least one alkaline salt of carboxymethyl hydroxyethyl cellulose.

7. A method as claimed in claim 6, wherein from 10 to 15% by weight of said alkaline salt of carboxymethyl hydroxyethyl cellulose is incorporated into said reaction medium.

8. A method as claimed in claim 6 wherein the incorporation of said alkaline carboxymethyl hydroxyethyl cellulose salt is carried out by first homogeneously mixing a powder of said salt with the polyol to form a binary mixture and then adding to the binary mixture the surface active agent, the fatty acid salt and the tertiary amine before or while causing any of these substances to react with the water and the polyisocyanate.

9. A method as claimed in claim 8, wherein the particles of the alkaline salt powder have a diameter of less than 0.2 mm.

10. A method as claimed in claim 6, wherein said alkaline carboxymethyl hydroxyethyl cellulose salt is the sodium salt.

11. A method as claimed in claim 6, wherein said alkaline carboxymethyl hydroxyethyl cellulose salt has a degree of substitution of about 0.3 carboxymethyl groups and 0.7 hydroxyethyl groups.

12. A method as claimed in claim 6, which further comprises immersing the foam in a bath consisting of an aqueous solution of a metal salt having a valency of at least two and then wringing the foam and rinsing it in clear water.

13. A method as claimed in claim 12, wherein said metal salt is an aluminum salt.

14. A method as claimed in claim 13, wherein said aluminum salt is aluminum nitrate.

References Cited

UNITED STATES PATENTS

| | | | |
|---|---|---|---|
| 2,591,884 | 4/1952 | Simon | 260——2.5 |
| 3,004,934 | 10/1961 | Dosmann et al. | 260—2.5 |
| 2,920,983 | 1/1960 | Bugosh | 117—98 |

FOREIGN PATENTS

| | | | |
|---|---|---|---|
| 1,031,799 | 6/1966 | Great Britain | 260—2.5UX |
| 930,501 | 7/1963 | Great Britain | 260—2.5 |
| 1,063,474 | 3/1967 | Great Britain | 260—2.5 |
| 1,210,555 | 2/1966 | Germany | 260—2.5 |

OTHER REFERENCES

Dutch patent specification 6806061 (November 1968).

Condensed Chemical Dictionary, 5th ed., Reinhold, New York (1956), p. 997, call No. QD5C5.

DONALD E. CZAJA, Primary Examiner

H. S. COCKERAM, Assistant Examiner

U.S. Cl. X.R.

15—244; 260—13, 18, 231